(12) United States Patent
Sorimoto

(10) Patent No.: US 11,213,984 B2
(45) Date of Patent: Jan. 4, 2022

(54) UNDERCUT PROCESSING MECHANISM AND MOLDING DIE ASSEMBLY

(71) Applicant: Technocrats Corporation, Hiroshima (JP)

(72) Inventor: Masanori Sorimoto, Hiroshima (JP)

(73) Assignee: TECHNOCRATS CORPORATION, Hiroshima (JP)

(*) Notice: Subject to any disclaimer, the term of this patent is extended or adjusted under 35 U.S.C. 154(b) by 0 days.

(21) Appl. No.: 16/234,392

(22) Filed: Dec. 27, 2018

(65) Prior Publication Data

US 2019/0126526 A1 May 2, 2019

Related U.S. Application Data

(63) Continuation of application No. PCT/JP2017/012247, filed on Mar. 27, 2017.

(51) Int. Cl.
*B29C 45/44* (2006.01)
*B29C 45/26* (2006.01)
(Continued)

(52) U.S. Cl.
CPC .......... *B29C 45/4435* (2013.01); *B29C 33/44* (2013.01); *B29C 39/34* (2013.01);
(Continued)

(58) Field of Classification Search
CPC .......... B29C 45/4435; B29C 2045/445; B29C 33/44; B29C 33/442; B29C 33/48;
(Continued)

(56) References Cited

U.S. PATENT DOCUMENTS 3,707,303 A 12/1972 Petri
8,029,267 B2 10/2011 Takao
(Continued)

FOREIGN PATENT DOCUMENTS

CN 106103038 A 11/2016
CN 106239844 A 12/2016
(Continued)

OTHER PUBLICATIONS

International Search Report for International Application No. PCT/JP2017/012247, entitled "Undercut Processing Mechanism, Molding Die Assembly and Molded Article," 4 pages, dated Apr. 25, 2017.
(Continued)

*Primary Examiner* — Xiao S Zhao
*Assistant Examiner* — Nicholas J Chidiac
(74) *Attorney, Agent, or Firm* — Hamilton, Brook, Smith & Reynolds, P.C.

(57) ABSTRACT

An undercut processing mechanism that is installed in a molding die assembly configured to form a molded article having an undercut portion so as to allow demolding of the undercut portion, the undercut processing mechanism comprising: a pushing piece movable in a demolding direction of the molded article; a support element fixed to the pushing piece or formed so as to be integrated with the pushing piece and capable of supporting the undercut portion during movement of the pushing piece; a sliding piece configured to be slidable relative to the pushing piece and to move, in conjunction with movement of the pushing piece, in a direction intersecting the demolding direction of the molded article; and a retaining piece configured to retain the sliding piece such that the sliding piece is slidable.

8 Claims, 10 Drawing Sheets

(51) Int. Cl.
  *B29C 33/44*  (2006.01)
  *B29C 39/34*  (2006.01)
  *B29C 43/42*  (2006.01)

(52) U.S. Cl.
  CPC .............. *B29C 43/42* (2013.01); *B29C 45/26* (2013.01); *B29C 45/44* (2013.01)

(58) Field of Classification Search
  CPC ......... B29C 39/34; B29C 43/42; B29C 45/40; B29C 45/44
  See application file for complete search history.

(56) References Cited

U.S. PATENT DOCUMENTS

| | | | |
|---|---|---|---|
| 2010/0221379 | A1 | 9/2010 | Takao |
| 2011/0311665 | A1 | 12/2011 | Kimura |
| 2012/0070525 | A1 | 3/2012 | Wang et al. |
| 2013/0075043 | A1 | 3/2013 | Wagner |
| 2018/0243960 | A1 | 8/2018 | Sorimoto |
| 2019/0126527 | A1 | 5/2019 | Sorimoto |
| 2020/0031031 | A1 | 1/2020 | Sorimoto |

FOREIGN PATENT DOCUMENTS

| | | | |
|---|---|---|---|
| CN | 106426673 | A | 2/2017 |
| CN | 206048721 | U | 3/2017 |
| EP | 3366447 | A | 8/2018 |
| GB | 284493 | A | 2/1928 |
| JP | 58078735 | * | 5/1983 |
| JP | 58078735 | A | 5/1983 |
| JP | 62130817 | A | 6/1987 |
| JP | 63006823 | | 1/1988 |
| JP | 02009520 | | 1/1990 |
| JP | 04090519 | U1 | 8/1992 |
| JP | 05200806 | A | 8/1993 |
| JP | H08-216203 | A | 8/1996 |
| JP | 09-085786 | A | 3/1997 |
| JP | H11-163012 | A | 6/1999 |
| JP | 2002-036314 | A | 2/2002 |
| JP | 2002172641 | A | 6/2002 |
| JP | 2003320561 | A | 11/2003 |
| JP | 3117386 | U | 1/2006 |
| JP | 2010-083033 | * | 4/2010 |
| JP | 2010-083033 | A | 4/2010 |
| JP | 2010155381 | A * | 7/2010 |
| JP | 2010155381 | A | 7/2010 |
| JP | 2014097628 | A | 5/2014 |
| JP | 2014172378 | A | 9/2014 |
| JP | 5858437 | B | 2/2016 |
| JP | 2017036768 | A | 2/2017 |
| JP | 2017056474 | A | 3/2017 |
| KR | 2019-970028115 | U | 7/1997 |
| KR | 10-20090067841 | A | 6/2009 |
| WO | 2008143214 | A | 11/2008 |
| WO | 2018179027 | A1 | 10/2018 |
| WO | 2018193502 | A1 | 10/2018 |

OTHER PUBLICATIONS

International Preliminary Report on Patentability for International Application No. PCT/JP2017/012247, entitled "Undercut Processing Mechanism, Molding Die Assembly and Molded Article," 11 pages, dated Oct. 1, 2019.
Office Action, U.S. Appl. No. 16/234,417, dated Sep. 23, 2019.
Office Action, U.S. Appl. No. 16/234,417, dated Nov. 18, 2019.

* cited by examiner

UNDERCUT PROCESSING MECHANISM AND MOLDING DIE ASSEMBLY

CROSS REFERENCE TO THE RELATED APPLICATION

This application is a continuation of International Application No. PCT/JP2017/012247, which designated the United States and was filed on Mar. 27, 2017, published in Japanese, the entire content of which is herein incorporated by reference as a part of this application.

BACKGROUND OF THE INVENTION

Field of the Invention

The present invention relates to an undercut processing mechanism that is used in a state attached to a molding die assembly for forming a molded article having an undercut portion, a molding die assembly, and a molded article.

Description of Related Art

For a molding die assembly for forming a molded article having an undercut portion, various undercut processing mechanisms have been developed corresponding to forms of the undercut portions. For example, so called "loose core" is generally used as an undercut processing mechanism.

It has been difficult to mold some kind of molded articles by the use of an undercut processing mechanism utilizing a conventional loose core, for example, where a boss including a hollow portion projects in a direction intersecting a demolding direction of the entire body of the molded article. The applicant has proposed an undercut processing mechanism that allows a boss constituting an undercut portion to be easily demolded (see, for example, JP Laid-open Patent Publication No. 2010-155381).

The undercut processing mechanism described in JP Laid-open Patent Publication No. 2010-155381 includes: a holder provided in a fixed die (stationary die) or a movable die of a molding die assembly; and a mold core for forming an undercut portion, where the mold core includes a first core and a second core, and the first core and the second core have tilted side surfaces that are adjacent to each other. The undercut processing mechanism is configured to allow an undercut portion to be demolded by the first core and the second core sliding in the holder along the side surfaces.

According to the undercut processing mechanism described in JP Laid-open Patent Publication No. 2010-155381, it is made easier to form a molded article having a shape that is difficult to form by a conventional undercut processing mechanism using a loose core. In addition, a support rod, a guide rod, and the like become unnecessary, so that the undercut processing mechanism can be configured to be compact as compared to the conventional undercut processing mechanism using a loose core.

The present invention proposes: an undercut processing mechanism that has a structure different from that described in JP Laid-open Patent Publication No. 2010-155381, and that can make it easier to mold a molded article having an undercut portion, while downsizing the mechanism, and improving quality of the molded article; a molding die assembly; and a molded article.

An object of the present invention is to provide: an undercut processing mechanism that can be configured to be compact but can easily demold an undercut portion while improving quality of a molded article; a molding die assembly; and a molded article.

DISCLOSURE OF THE INVENTION

The present invention is directed to an undercut processing mechanism that is installed in a molding die assembly for forming a molded article having an undercut portion so as to allow demolding of the undercut portion, the undercut processing mechanism comprising: a pushing piece movable in a demolding direction of the molded article; a support element fixed to the pushing piece or formed so as to be integrated with the pushing piece and capable of supporting the undercut portion during movement of the pushing piece; a sliding piece configured to be slidable relative to the pushing piece and to move, in conjunction with movement of the pushing piece, in a direction intersecting the demolding direction of the molded article; and a retaining piece configured to retain the sliding piece such that the sliding piece is slidable, wherein the mechanism is configured such that when the pushing piece is moved in the demolding direction of the molded article, the sliding piece moves in conjunction with the pushing piece while the support element supports the undercut portion, so that the undercut portion is allowed to be demolded.

In the undercut processing mechanism, the pushing piece and the sliding piece may have molding surfaces for forming the undercut portion.

In the undercut processing mechanism, the pushing piece and/or the sliding piece is configured to be able to support the molded article when the pushing piece is moved in the demolding direction of the molded article.

In the undercut processing mechanism, the pushing piece and the retaining piece may each include restricting element for restricting a movement direction of the sliding piece to a direction in which the undercut portion is allowed to be demolded.

The undercut processing mechanism of the present invention may further includes: a molding member configured to form a hollow portion or a space portion of the undercut portion thereby enabling molding of the molded article having the hollow portion or the space portion in the undercut portion; and a molding member sliding piece fixed to the molding member or formed so as to be integrated with the molding member and configured to be slidable relative to the pushing piece and the retaining piece and to move such that the molding member is pulled out of the hollow portion or the space portion of the undercut portion when the pushing piece is moved in the demolding direction of the molded article.

The undercut processing mechanism may further include a holder fixed to the molding die assembly or formed so as to be integrated with the molding die assembly, and the holder may be configured such that, among components forming the undercut processing mechanism, other components excluding the holder are partially or fully housed in the holder in the time of die clamping.

The present invention is also directed to a molding die assembly including the undercut processing mechanism.

The present invention is also directed to a molded article formed by the undercut processing mechanism or the molding die assembly.

With the undercut processing mechanism and the molding die assembly of the present invention, the sliding piece moves in conjunction with movement of the pushing piece in the demolding direction of the molded article such that the undercut portion is allowed to be demolded. Thus, the undercut processing mechanism and the molding die assembly can be configured to be compact but allow the undercut portion to be easily demolded. In addition, since the undercut portion is supported by the support element during movement of the pushing piece and the sliding piece, damage to the undercut portion, etc., can be prevented, so that the molded article quality is improved.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DESCRIPTION OF EMBODIMENTS

A description of example embodiments follows.

Figure 1:
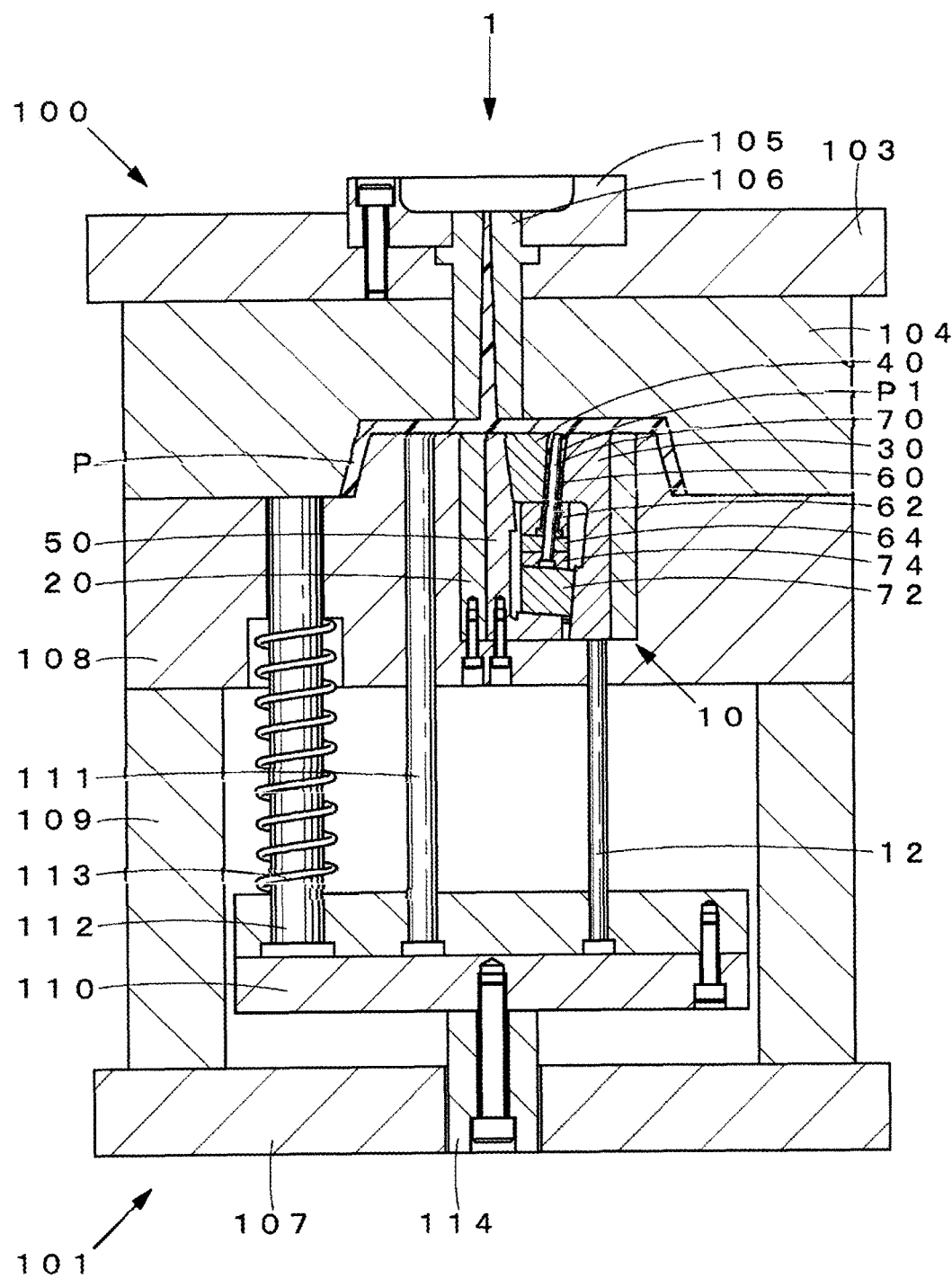
FIG. 1 is a cross-sectional view of a molding die assembly 1 according to a first embodiment of the present invention during mold clamping.
Figure 2:
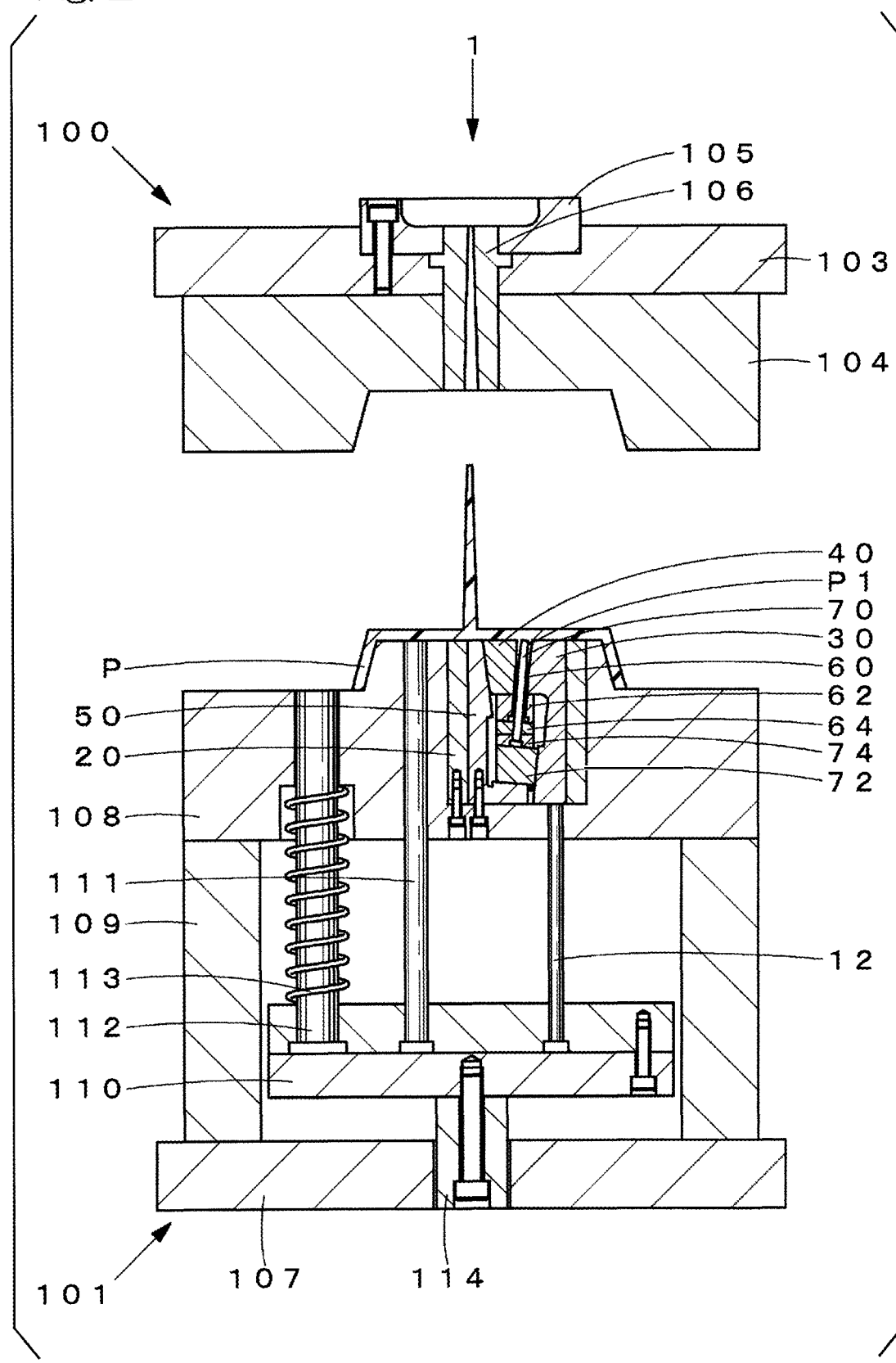
FIG. 2 is a cross-sectional view of the molding die assembly 1 in FIG. 1 after mold opening.
Figure 3:
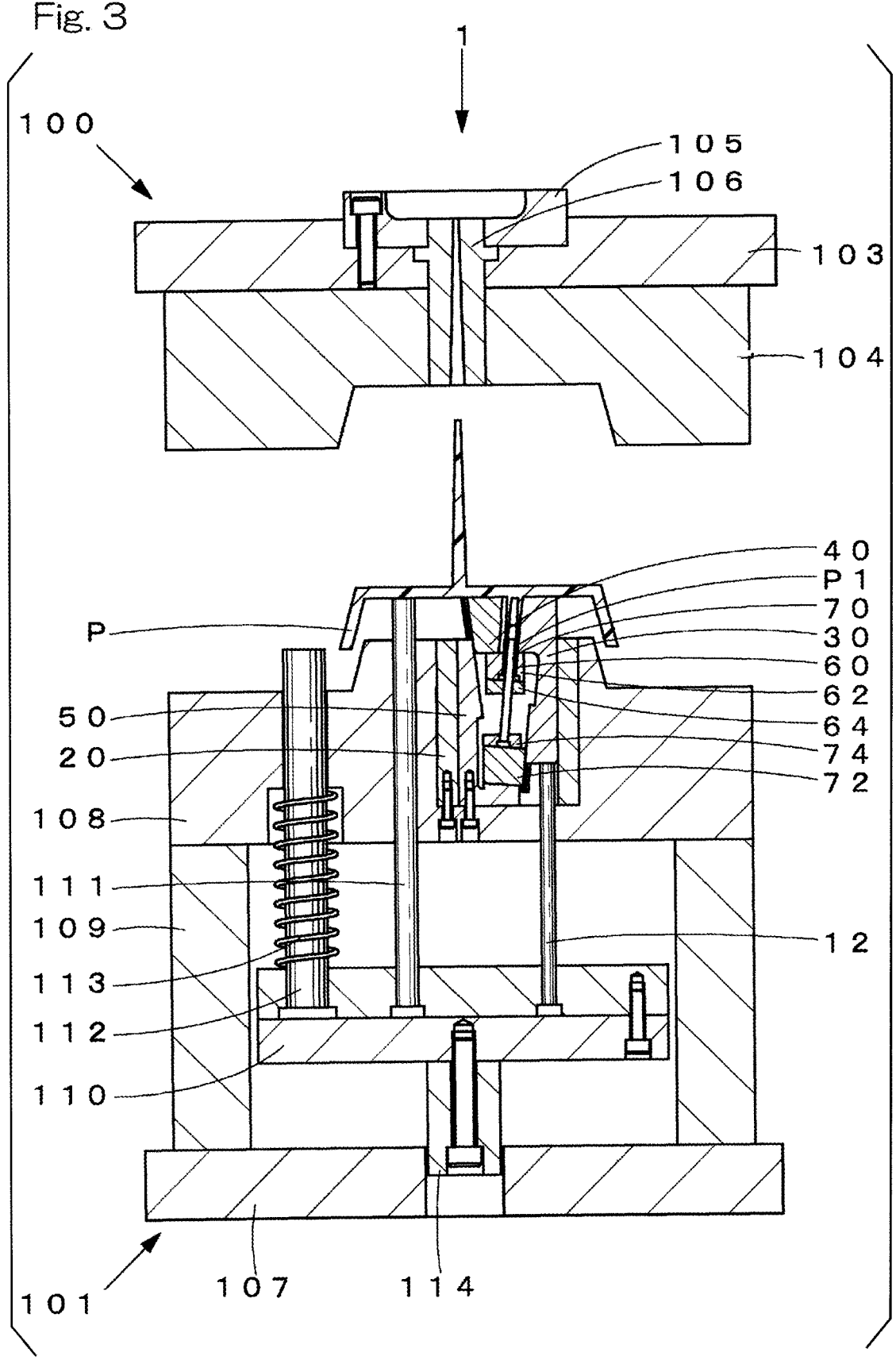
FIG. 3 is a cross-sectional view of the molding die assembly 1 in FIG. 1 after operation of ejecting a molded article P.
Figure 4:
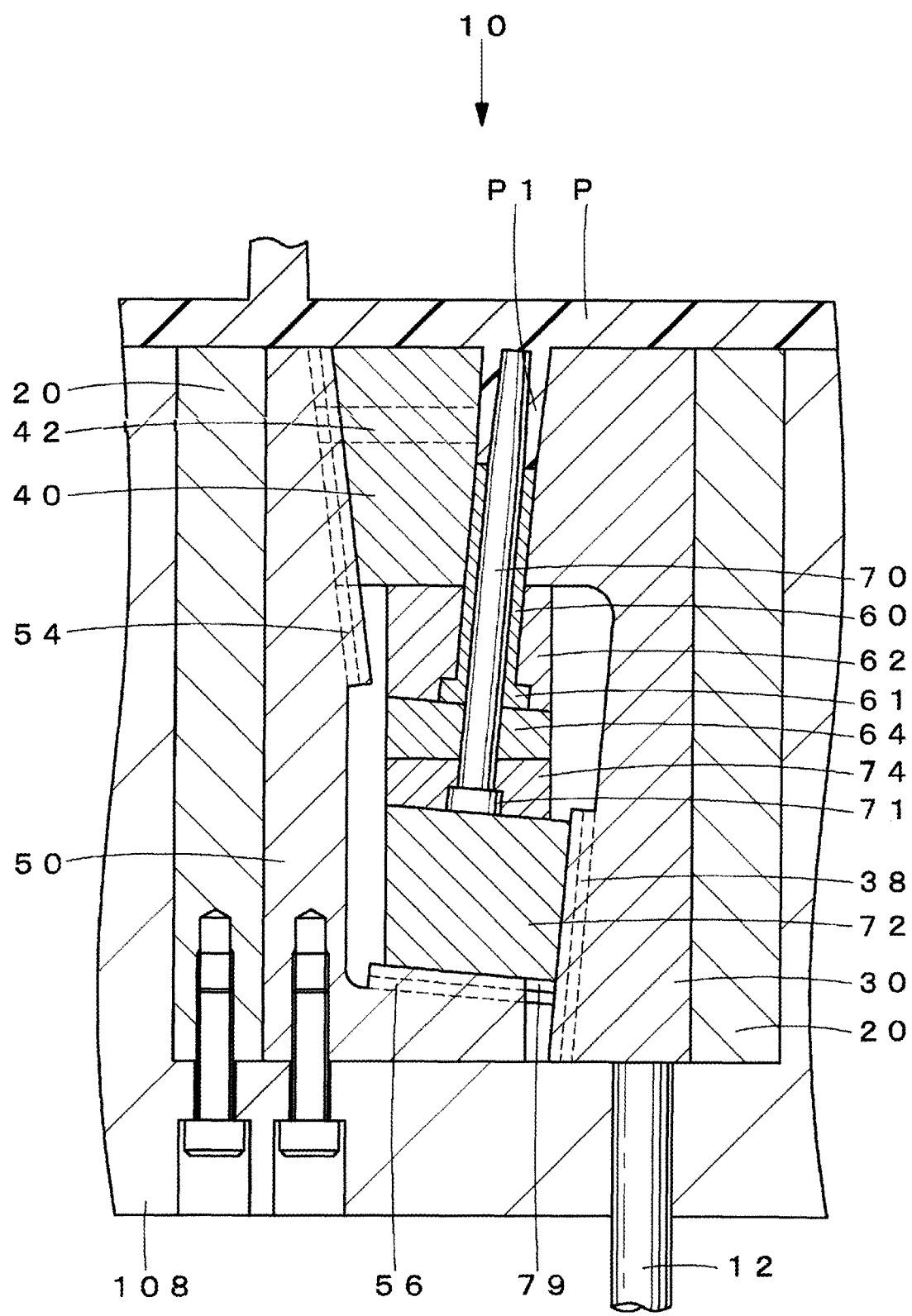
FIG. 4 is an enlarged view of an area around an undercut processing mechanism 10 in FIG. 1 and FIG. 2.
Figure 5:
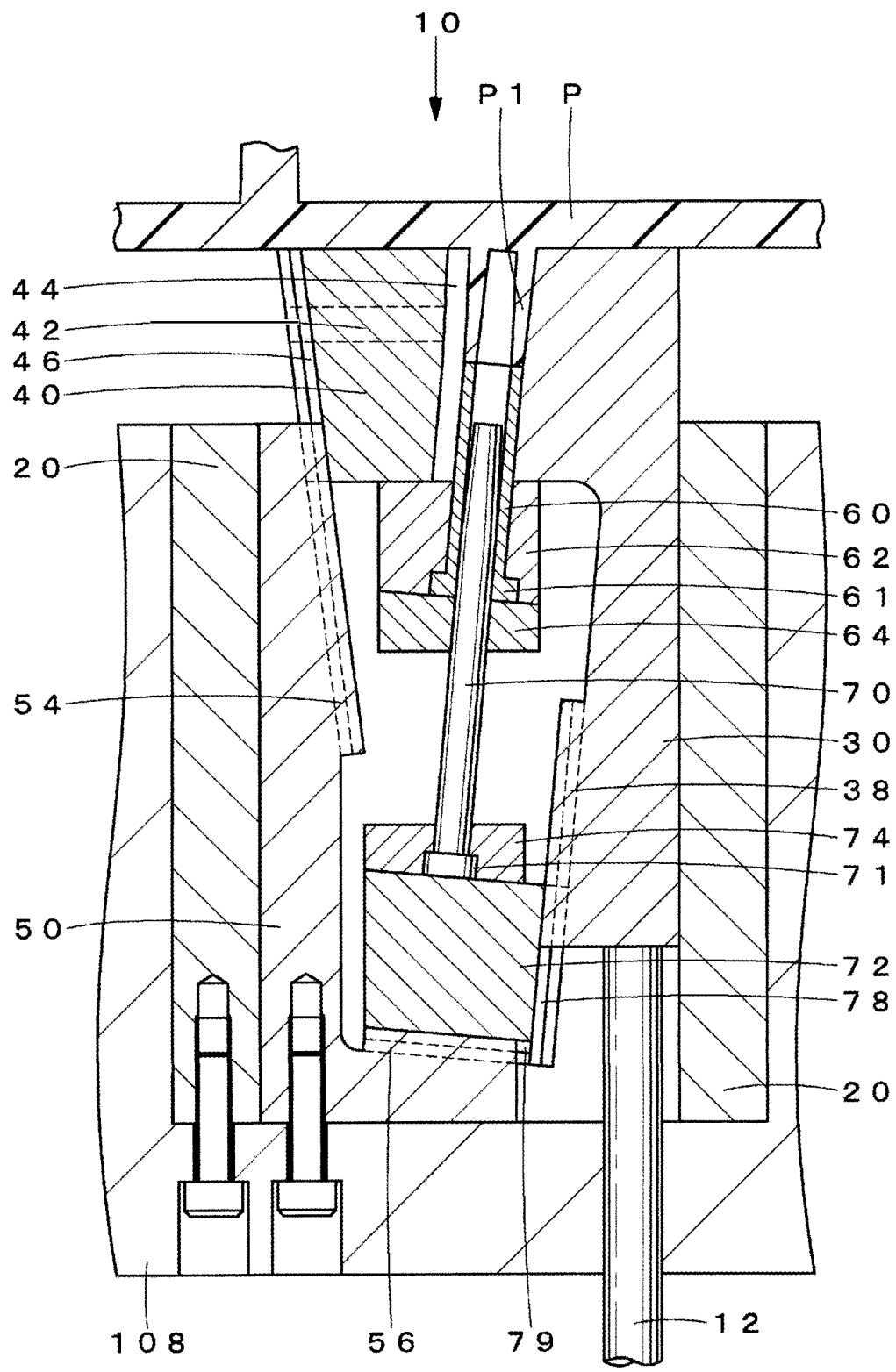
FIG. 5 is an enlarged view of an area around the undercut processing mechanism 10 in FIG. 3.
Figure 6:
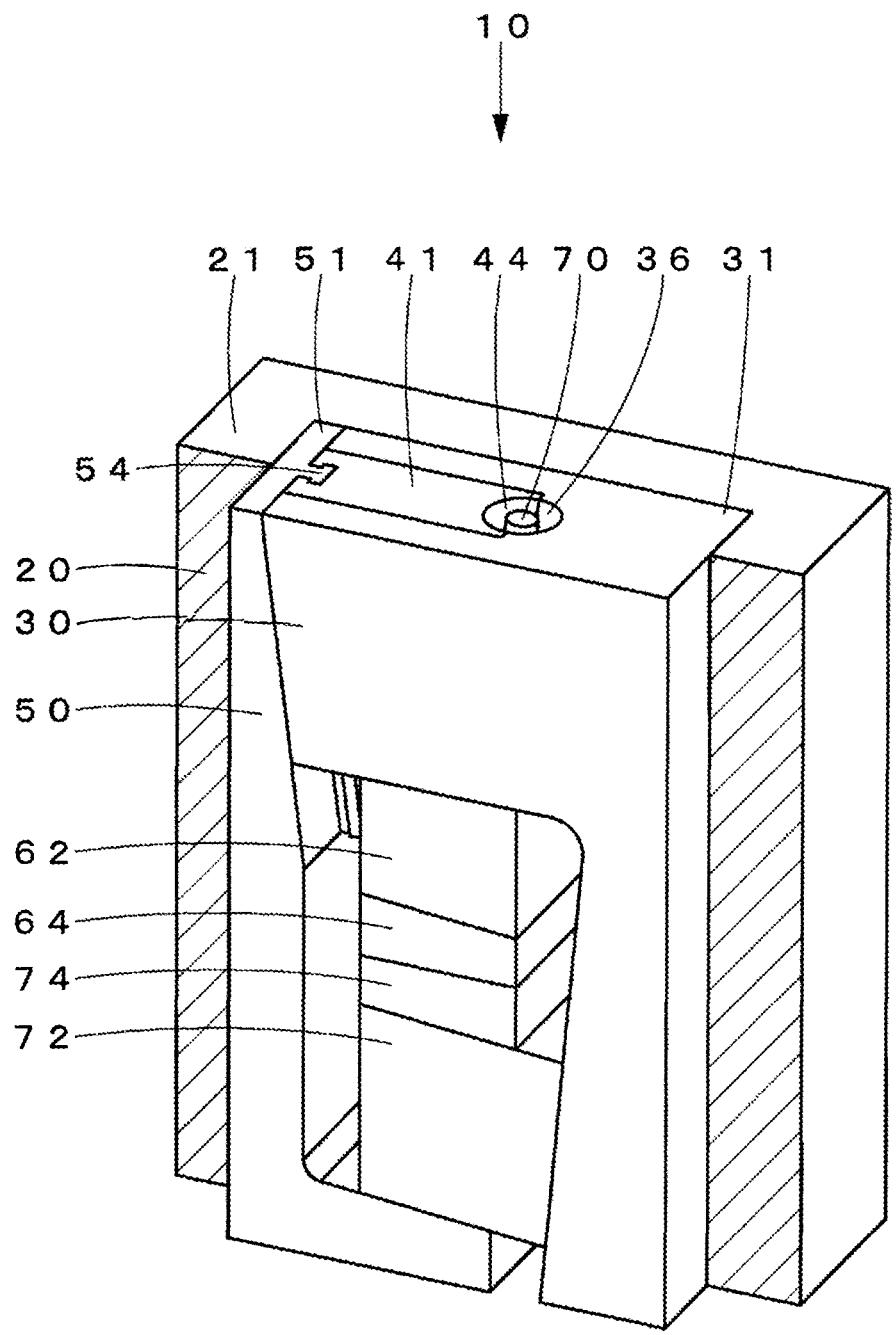
FIG. 6 is a perspective view of the undercut processing mechanism 10 of the molding die assembly 1 in FIG. 1.
Figure 7:
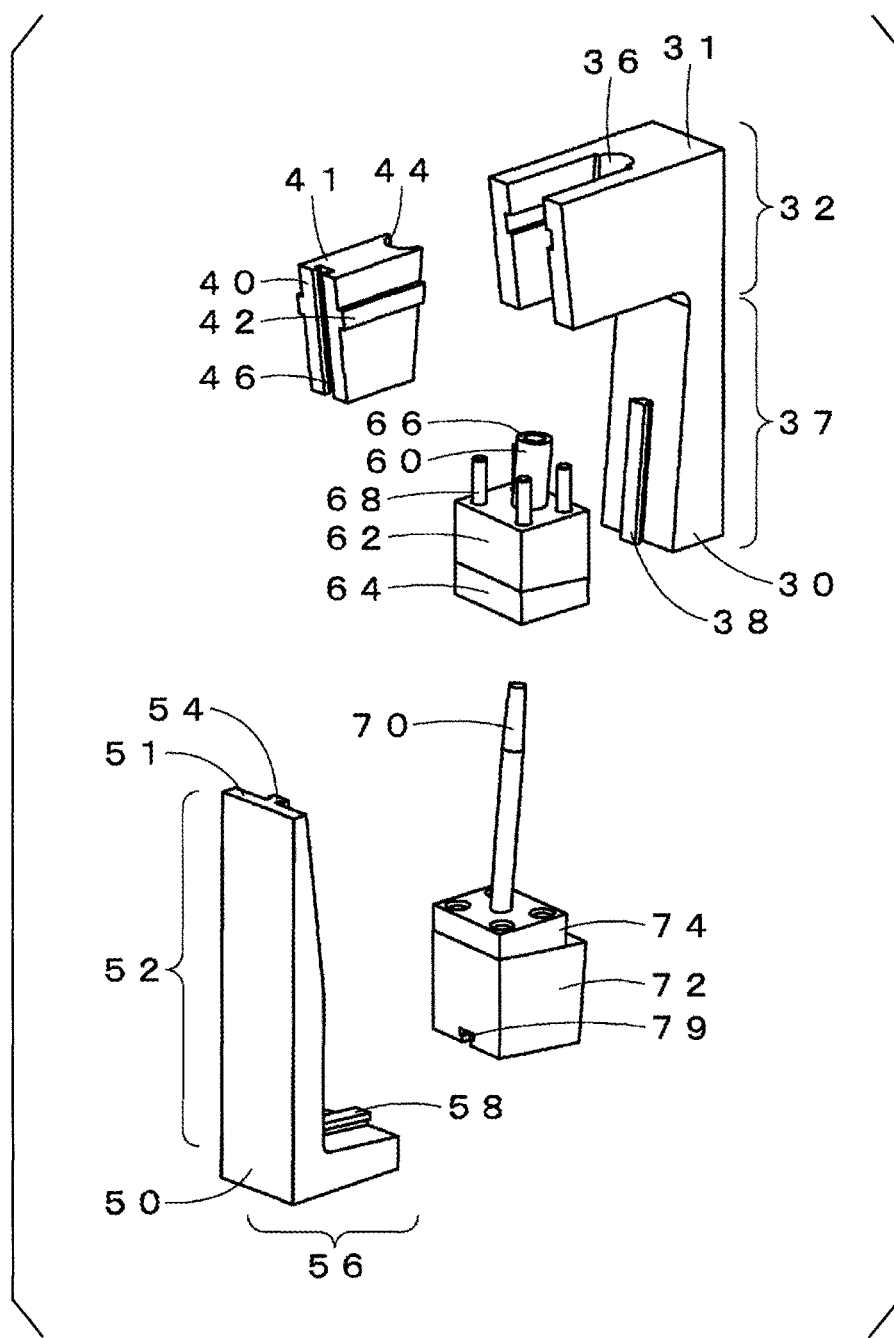
FIG. 7 is an exploded perspective view of the undercut processing mechanism 10 of the molding die assembly 1 in FIG. 1.
Figure 8:
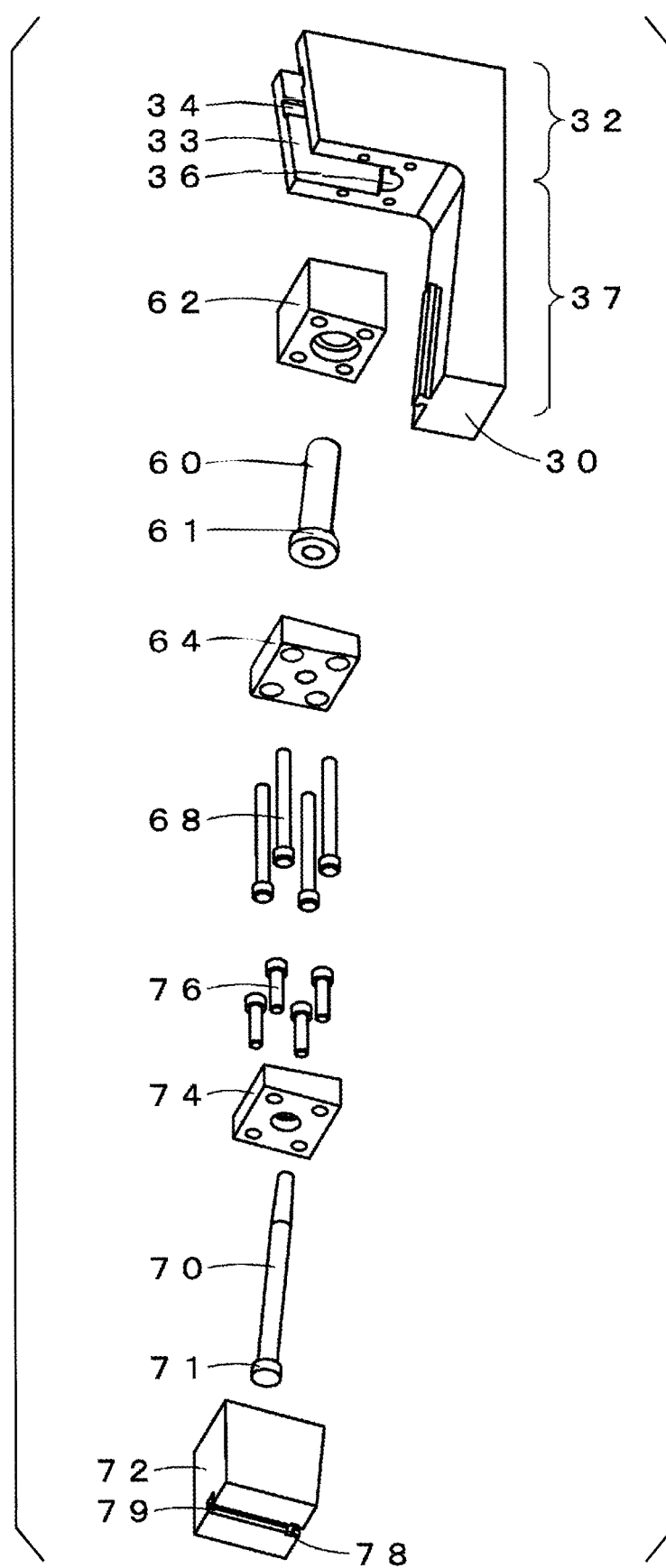
FIG. 8 is an exploded perspective view of the undercut processing mechanism 10 of the molding die assembly 1 in FIG. 1.
Figure 9A:
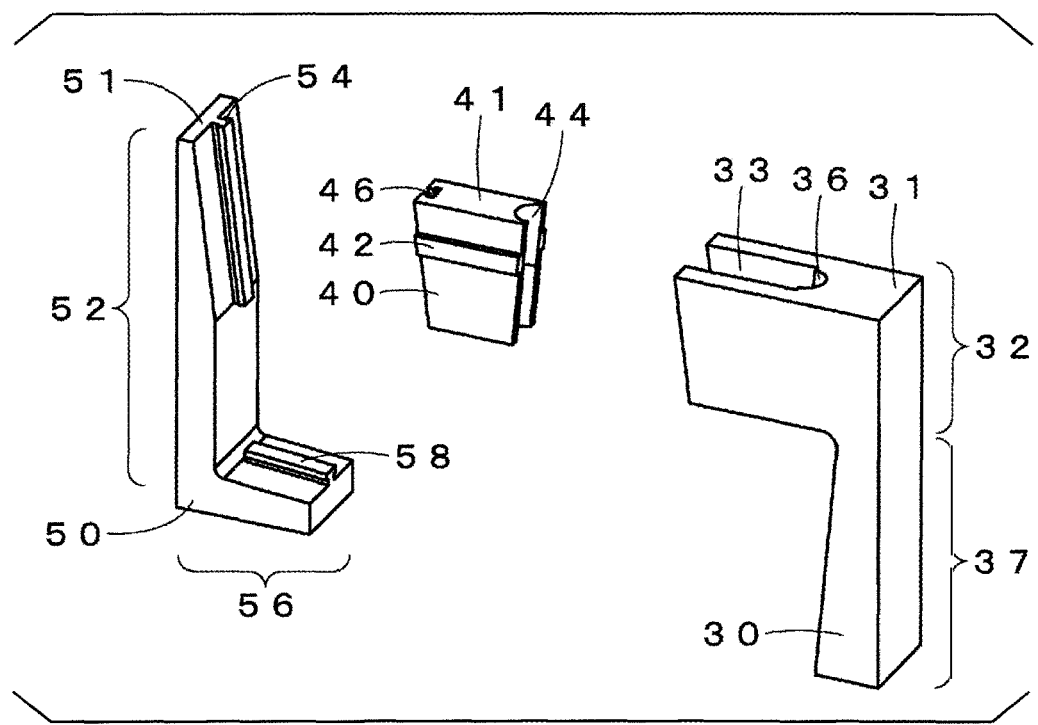
FIGS. 9A and 9B show perspective views of a pushing piece 30, a sliding piece 40, and a retaining piece 50 of the molding die assembly 1 in FIG. 1.
Figure 9B:
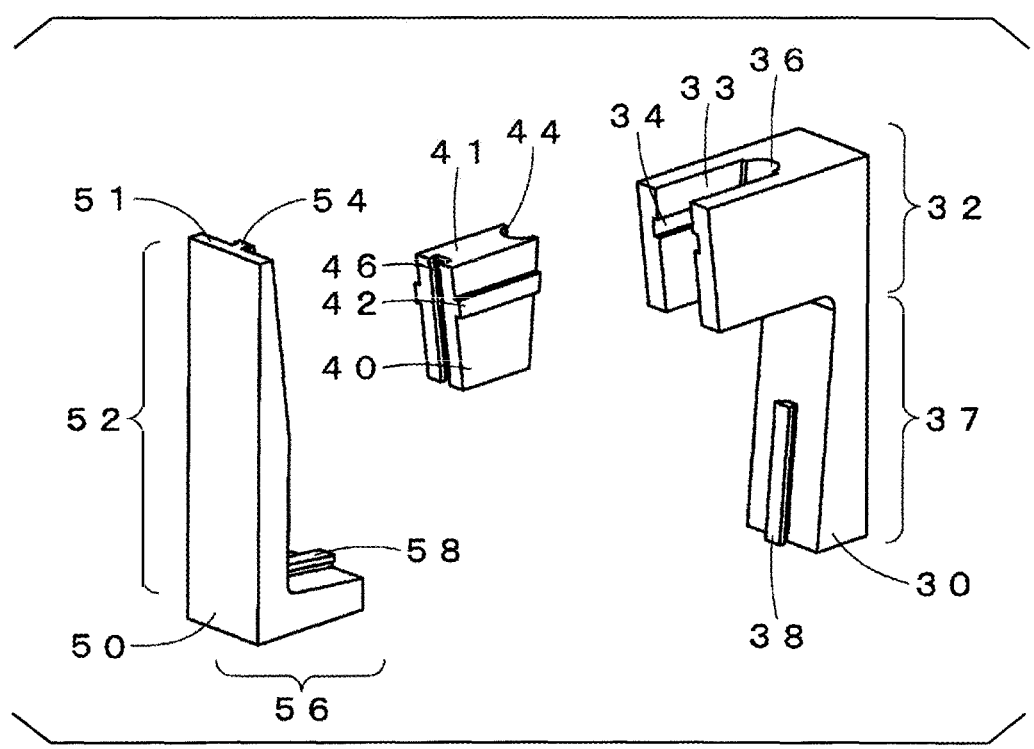

FIGS. 1 to 9B show a molding die assembly 1 according to a first embodiment of the present invention and portions of the assembly. In FIG. 1 to FIG. 3, some reference numerals are omitted. In FIG. 6, only a holder 20 is shown in cross-section. In FIG. 7, the holder 20 is omitted. In FIG. 8, the holder 20 and the retaining piece 50 are omitted.

The molding die assembly 1 according to the first embodiment of the present invention has a structure similar to a known injection molding die assembly. As shown in FIG. 1, the assembly includes a fixed die 100 for injecting a molding material and constituting the outer surface (upper surface) side of the molded article P (see FIG. 1) and a movable die 101 for constituting the inner surface (lower surface) side, including an undercut portion P1, of the molded article P. However, the molding die assembly 1 is different from the known injection molding die assembly in including the undercut processing mechanism 10. For the sake of convenience, a description will be given on the assumption that the fixed die 100 side in FIG. 1 is placed in an upper side and the movable die 101 in FIG. 1 is placed in a lower side.

Similar to the known injection molding die assembly, in the molding die assembly 1 according to the present embodiment, the fixed die 100 includes a fixed-side attachment plate 103, a fixed-side die plate 104, a locating ring 105, and a sprue bush 106. The movable die 101 includes a movable-side attachment plate 107, a movable-side die plate 108, a spacer block 109, two ejector base plates 110, an ejector pin 111, a return pin 112, a spring 113, and an ejector rod 114. After end of molding and mold opening, the ejector base plates 110 move relative to the movable-side die plate 108 in a demolding (ejecting) direction of the molded article P (the upward direction in FIG. 1), whereby the molded article P is ejected by the ejector pin 111. The above components are the same as those in the known injection molding die assembly, and thus the description thereof is omitted.

In the molding die assembly 1 according to the present embodiment, the undercut processing mechanism 10 that allows the undercut portion P1 to be demolded is installed in the movable die 101. A pushing piece ejector pin 12 is erected on the ejector base plates 110 in addition to the ejector pin 111. The pushing piece ejector pin 12 causes the pushing piece 30 of the later-described undercut processing mechanism 10 to reciprocate in the demolding direction of the molded article P in conjunction with movement of the ejector base plates 110.

The undercut processing mechanism 10 allows the undercut portion P1 to be demolded from the molding die assembly 1 during demolding of (operation of ejecting) the molded article P. In the present embodiment, the undercut portion P1 is a cylindrical boss that projects from the lower surface of the molded article P in a direction intersecting the demolding direction of the molded article P (the upward direction in FIG. 1). The undercut portion that can be molded and demolded in the undercut processing mechanism, the molding die assembly, and the molded article of the present invention is not limited to the cylindrical boss as described later. In addition, the material of the molded article P may not only be a synthetic resin such as plastic but also a metal such as iron, copper, or aluminum.

The undercut processing mechanism 10 includes: the holder 20 embedded in and fixed to the movable-side die plate 108; the pushing piece 30 capable of reciprocating in the demolding direction of the molded article P; the sliding piece 40 capable of sliding relative to the pushing piece 30 in a direction orthogonal to the demolding direction of the molded article P; and the retaining piece 50 that is fixed to the movable-side die plate 108 and retains the sliding piece 40 such that the sliding piece 40 is slidable. The undercut processing mechanism 10 further includes a sleeve pin 60 that is supporting element fixed to the pushing piece 30 and configured to support the undercut portion P1; and a first fixing block 62 and a second fixing block 64 that fix the sleeve pin 60 to the pushing piece 30. The undercut processing mechanism 10 still further includes a center pin 70 that is a molding member for forming a hollow portion of the undercut portion P1; a molding member sliding piece 72 that fixes the center pin 70 and is capable of sliding relative to the pushing piece 30 and the retaining piece 50; and a fixing block 74 that fixes the center pin 70 to the molding member sliding piece 72. The undercut processing mechanism 10 is configured such that, when the pushing piece 30 moves in the demolding direction of the molded article P during demolding of the molded article P, the sliding piece 40 and the molding member sliding piece 72 move in conjunction with the movement of the pushing piece 30, whereby the undercut portion P1 is allowed to be demolded.

Among the components forming the undercut processing mechanism 10, the other components excluding the holder 20 can be fully housed in the holder 20 during mold clamping. Thus, the holder 20 allows the undercut processing mechanism 10 to be made into a single unit and makes it easy to install the undercut processing mechanism 10 in the molding die assembly 1. The holder 20 has a square tube shape, and is embedded in a groove formed on the movable-side die plate 108 and fixed to the movable-side die plate 108 by means of a bolt. The holder 20 may be formed so as to be integrated with the movable-side die plate 108. In this case, the other components of the undercut processing mechanism 10 are sequentially assembled to the movable-side die plate 108.

The holder 20 is formed and disposed such that an upper surface 21 thereof becomes flush with the upper surface of the movable-side die plate 108 when the molding die assembly 1 is clamped, and becomes a molding surface in contact with the lower surface of the molded article P during molding. Thus, in order to prevent molding failure of the molded article P, the holder 20 is formed and disposed such that no gap is generated between the upper surface 21 of the holder 20 and the upper surface of the movable-side die plate 108 during mold clamping.

The shape of the holder 20 is not limited to the square tube shape, and may have a cylindrical shape or a tube shape having a polygonal cross-section. In this case, the shapes of the components of the undercut processing mechanism 10 other than the holder 20 only need to be changed as appropriate in accordance with the shape of the holder 20. In addition, the holder 20 may be configured to be divided into a plurality of blocks. Moreover, the holder 20 is not limited to a holder in which, among the components forming the undercut processing mechanism 10, the other components excluding the holder 20 are fully housed during mold clamping, and may be configured such that the other components are partially housed therein.

The pushing piece 30 serves to form the lower surface of the molded article P and the undercut portion P1, and moves in the demolding direction of the molded article P in conjunction with the ejector base plates 110, during operation of ejecting the molded article P, to eject the molded article P together with the ejector pin 111.

The pushing piece 30 is a block having an inverted L shape and has a lower surface to which the pushing piece ejector pin 12 is fixed. The pushing piece 30 has: a recess 33 that is provided by hollowing out an upper portion 32 such that the entire sliding piece 40 is fitted thereinto; horizontal grooves 34 that are restricting element horizontally provided on the recess 33 and configured to restrict a movement direction of the sliding piece 40 by projections 42 of the later-described sliding piece 40 being slidably fitted thereinto; a molding surface 36 that is provided in the surface of the recess 33 at the inner side, has a semicircular groove shape, and serves to form the outer circumferential surface of the undercut portion P1; and a tilted projection 38 that is restricting element provided on the inner surface of a lower portion 37 and configured to restrict a movement direction of the molding member sliding piece 72 by a first dovetail groove 78 of the later-described molding member sliding piece 72 being slidably engaged therewith.

An upper surface 31 of the pushing piece 30 is a molding surface for forming the lower surface of the molded article P during molding and is also a support surface for supporting the molded article P during ejecting operation. Thus, in order to prevent molding failure of the molded article P, the pushing piece 30 is formed and disposed such that no gap is generated between the upper surface 31 of the pushing piece 30 and the upper surface 21 of the holder 20 during mold clamping.

The restricting element configured to restrict the movement direction of the sliding piece 40 is not limited to the horizontally provided horizontal grooves 34 and only needs to be provided such that the sliding piece 40 is moved to a position at which the undercut portion P1 is allowed to be demolded.

The tilted projection 38 is tilted so as to be parallel to the central axis of the hollow portion of the undercut portion P1 such that the center pin 70 is pulled out of the hollow portion of the undercut portion P1 by movement of the molding member sliding piece 72.

The sliding piece 40 serves to form the lower surface of the molded article P and the undercut portion P1, and moves along the horizontal grooves 34 of the pushing piece 30 in conjunction with the pushing piece 30 during operation of ejecting the molded article P such that the undercut portion P1 is allowed to be demolded.

The sliding piece 40 is a trapezoidal block and has: the projections 42 that are restricting element provided on both side surfaces such that the projections 42 are slidably fitted into the horizontal grooves 34 of the pushing piece 30, and configured to restrict the movement direction of the sliding piece 40. The sliding piece 40 has also a molding surface 44 that is provided in a tilted surface opposing the pushing piece 30, which molding surface 44 has a semicircular groove shape and serves to form the outer circumferential surface of the undercut portion P1; and a dovetail groove 46 that is restricting element provided on a tilted surface at the opposite side and configured to restrict the movement direction of the sliding piece 40 by slidably engaging with a first tilted projection 54 of the later-described retaining piece 50. The tilt angle of the dovetail groove 46 is equal to the tilt angle of the first tilted projection 54 of the later-described retaining piece 50.

An upper surface 41 of the sliding piece 40 is a molding surface for forming the lower surface of the molded article P during molding and is also a support surface for supporting the molded article P during ejecting operation. Thus, in order to prevent molding failure of the molded article P, the sliding piece 40 is formed and disposed such that, during mold clamping, no gap is generated between the upper surface 41 of the sliding piece 40 and the upper surface 31 of the pushing piece 30, and between the upper surface 41 of the sliding piece 40 and an upper surface 51 of the retaining piece 50.

The retaining piece 50 is fixed to the movable-side die plate 108 and retains the sliding piece 40 and the molding member sliding piece 72 such that the sliding piece 40 and the molding member sliding piece 72 are slidable. The retaining piece 50 is a block having an L shape and has: the first tilted projection 54 that is restricting element provided on the inner surface of an upper portion 52 and configured to restrict the movement direction of the sliding piece 40 by the dovetail groove 46 of the sliding piece 40 being slidably engaged therewith. The retaining piece 50 further includes a second tilted projection 58 that is restricting element provided on a lower portion 56 and configured to restrict the movement direction of the molding member sliding piece 72 by a second dovetail groove 79 of the later-described molding member sliding piece 72 being slidably engaged therewith.

The retaining piece 50 is formed and disposed such that the upper surface 51 thereof becomes flush with the upper surface 21 of the holder 20 when the molding die assembly 1 is clamped, and becomes a molding surface in contact with the lower surface of the molded article P during molding. Thus, in order to prevent molding failure of the molded article P, the retaining piece 50 is formed and disposed such that, during mold clamping, no gap is generated between: the upper surface 51 of the retaining piece 50; and the upper surface 21 of the holder 20, the upper surface 31 of the pushing piece 30, and the upper surface 41 of the sliding piece 40.

The first tilted projection 54 is provided so as to be tilted relative to the demolding direction of the molded article P, and the tilt angle of the first tilted projection 54 is determined such that, after completion of ejecting operation, the sliding piece 40 moves to a position at which the undercut portion P1 is allowed to be demolded. The larger the tilt angle of the first tilted projection 54 relative to the demolding direction of the molded article P is, the larger the amount of movement of the sliding piece 40 with respect to the amount of movement of the pushing piece 30 is.

The second tilted projection 58 is tilted so as to be orthogonal to the central axis of the hollow portion of the undercut portion P1. By this configuration, with ejection of the molded article P, the molding member sliding piece 72 moves such that the center pin 70 is pulled out of the hollow portion of the undercut portion P1.

The sleeve pin 60 serves as a support element for supporting an end surface of the undercut portion P1 during ejecting operation. The sleeve pin 60 is a cylindrical member and has: a distal end surface 66 that becomes a support surface for supporting the end surface of the undercut portion P1 during ejecting operation; and a fixing flange portion 61 formed at a proximal end thereof. The sleeve pin 60 has a hollow portion that is formed such that the center pin 70 can be inserted thereinto.

The flange portion 61 of the sleeve pin 60 is held between the first fixing block 62 and the second fixing block 64. In this state, the second fixing block 64 is fixed to the pushing piece 30 by means of bolts 68. Thus, the sleeve pin 60 is fixed to the pushing piece 30. The sleeve pin 60 may be formed so as to be integrated with the pushing piece 30. In this case, the flange portion 61, the first fixing block 62, the second fixing block 64, and the bolts 68 are unnecessary. Alternatively, the sleeve pin 60 and the first fixing block 62 and/or the second fixing block 64 may be formed so as to be integrated with each other.

The center pin 70 serves to form the inner circumferential surface and the ceiling surface of the undercut portion P1. The center pin 70 is a columnar pin member and has: a distal end portion formed in a tapered shape so as to correspond to the shape of the inner circumferential surface of the undercut portion P1; and a fixing flange portion 71 formed at a proximal end thereof.

The flange portion 71 of the center pin 70 is held between the molding member sliding piece 72 and the fixing block 74. In this state, the fixing block 74 is fixed to the molding member sliding piece 72 by means of bolts 76. Thus, the center pin 70 is fixed to the molding member sliding piece 72. The center pin 70 is fixed to the molding member sliding piece 72 such that: the center pin 70 is movable in a state where the center pin 70 is inserted into the hollow portion of the sleeve pin 60; and the central axis of the center pin 70 coincides with the central axis of the undercut portion P1. The center pin 70 and the molding member sliding piece 72 may be formed so as to be integrated with each other. In this case, the flange portion 71, the fixing block 74, and the bolts 76 are unnecessary.

The molding member sliding piece 72 moves in conjunction with the pushing piece 30, during ejecting operation, to move the center pin 70 in a direction in which the center pin 70 is pulled out of the hollow portion of the undercut portion P1. The direction in which the center pin 70 is pulled out of the hollow portion of the undercut portion P1 is the movement direction of the center pin 70 in which the center pin 70 is detached from the hollow portion of the undercut portion P1 without deforming and damaging the undercut portion P1. In the present embodiment, the direction coincides with the central axis of the hollow portion of the undercut portion P1 and in which the center pin 70 is moved away from the undercut portion P1.

The molding member sliding piece 72 is a trapezoidal block and has: the first dovetail groove 78 that is restricting element provided on one tilted surface opposing the pushing piece 30 and configured to restrict the movement direction of the molding member sliding piece 72 by slidably engaging with the tilted projection 38 of the pushing piece 30; and the second dovetail groove 79 that is restricting element provided on the lower surface of the molding member sliding piece 72 and configured to restrict the movement direction of the molding member sliding piece 72 by slidably engaging with the second tilted projection 58 of the retaining piece 50. The tilt angle of the first dovetail groove 78 is equal to the tilt angle of the tilted projection 38 of the pushing piece 30, and the tilt angle of the second dovetail groove 79 is equal to the tilt angle of the second tilted projection 58 of the retaining piece 50.

Next, operation of the molding die assembly 1 according to the present embodiment will be described. During molding of the molded article P, in a state where the molding die assembly 1 is clamped, a molding material is injected through the sprue bush 106 of the fixed die 100 and hardened to form the molded article P (see FIG. 1 and FIG. 4).

During molding, the upper surface 21 of the holder 20, the upper surface 31 of the pushing piece 30, the upper surface 41 of the sliding piece 40, and the upper surface 51 of the retaining piece 50 of the undercut processing mechanism 10 become flush with the upper surface of the movable-side die plate 108 and come into contact with the molded article P (molding material) for forming the molded article P, and the molding surface 36 of the pushing piece 30, the molding surface 44 of the sliding piece 40, the distal end surface 66 of the sleeve pin 60, and the outer circumferential surface of the center pin 70 form the undercut portion P1 of the molded article P.

After molding, the molding die assembly 1 is opened. During opening of the molding die assembly 1, the entire movable die 101 moves downward from the state in FIG. 1, and the molded article P remains at the movable die 101 side (see FIG. 2). After the molding die assembly 1 is opened, operation of ejecting the molded article P is performed.

During ejecting operation, the ejector base plates 110 moves upward from the state in FIG. 2. In the undercut processing mechanism 10, with the movement of the ejector base plates 110, the pushing piece 30 is pressed by the pushing piece ejector pin 12, so that the pushing piece 30 and the sliding piece 40 protrude from the upper surface of the movable-side die plate 108 to push the molded article P together with the ejector pin 111 upward from the state in FIG. 2.

Simultaneously with this, owing to the action of the horizontal grooves 34 of the pushing piece 30, the projections 42 and the dovetail groove 46 of the sliding piece 40, and the first tilted projection 54 of the retaining piece 50, the sliding piece 40 moves along the horizontal grooves 34 leftward from the state in FIG. 2 and FIG. 4 and becomes detached from the undercut portion P1 (see FIG. 3 and FIG. 5).

In addition, simultaneously, owing to the action of the tilted projection 38 of the pushing piece 30, the second tilted projection 58 of the retaining piece 50, and the first dovetail groove 78 and the second dovetail groove 79 of the molding member sliding piece 72, the center pin 70 moves along the central axis thereof in a lower left direction relative to the undercut portion P1 from the state in FIG. 2 and FIG. 4 and becomes detached from the undercut portion P1 (see FIG. 3 and FIG. 5). Moreover, during pushing-up operation, the end surface of the undercut portion P1 is supported by the distal end surface 66 of the sleeve pin 60.

When ejecting operation is completed, the sliding piece 40 and the center pin 70 become detached from the undercut portion P1, and the molded article P is ejected from the movable-side die plate 108 by the ejector pin 111, the pushing piece 30, and the sliding piece 40 and thus can be taken out (see FIG. 3 and FIG. 5). After the molded article P is taken out, the molding die assembly 1 is clamped again in order to form next (another) one of the molded article P.

During mold clamping, the entire movable die 101 moves upward from the state in FIG. 3, and the ejector base plates 110 move downward from the state in FIG. 3. In the undercut processing mechanism 10, with the movement of the ejector base plates 110, the pushing piece 30 is drawn into the movable-side die plate 108 by the pushing piece ejector pin 12.

Simultaneously with this, owing to the action of the horizontal grooves 34 of the pushing piece 30, the projections 42 and the dovetail groove 46 of the sliding piece 40, and the first tilted projection 54 of the retaining piece 50, the sliding piece 40 moves along the horizontal grooves 34 of the pushing piece 30 rightward from the state in FIG. 3 and is housed in the recess 33 of the pushing piece 30; and owing to the action of the tilted projection 38 of the pushing piece 30, the second tilted projection 58 of the retaining piece 50, and the first dovetail groove 78 and the second dovetail groove 79 of the molding member sliding piece 72, the center pin 70 moves along the central axis thereof in an upper right direction from the state in FIG. 3 and returns to the position for molding. In addition, the upper surface 21 of the holder 20, the upper surface 31 of the pushing piece 30, and the upper surface 41 of the sliding piece 40 become flush with the upper surface of the movable-side die plate 108. After completion of mold clamping, the molding material is injected and the next one of the molded article P is molded.

As described above, with the molding die assembly 1 and the undercut processing mechanism 10 according to the present embodiment, the sliding piece 40 and the center pin 70 (the molding member sliding piece 72) move in conjunction with movement of the pushing piece 30 in the demolding direction of the molded article P such that the undercut portion P1 is allowed to be demolded. Thus, the molding die assembly 1 and the undercut processing mechanism 10 can be configured to be compact but allow the undercut portion P1 to be easily demolded. In addition, since the end surface of the undercut portion P1 is supported by the sleeve pin 60 during ejecting operation, damage to the undercut portion P1, etc., can be prevented, so that the molded article quality is improved.

In the molding die assembly 1 according to the present embodiment, the ejector pin 111 is used for ejecting the molded article P. However, depending on conditions such as the position of the undercut portion P1 formed on the molded article P and the weight of the undercut portion P1, the molded article P can be ejected only with the pushing piece 30, so that the size and the cost of the molding die assembly 1 can be further reduced.

While the undercut processing mechanism, the molding die assembly, and the molded article of the present invention have been described above by using the molding die assembly 1 according to the first embodiment, the undercut processing mechanism, the molding die assembly, and the molded article of the present invention are not limited to the above-described embodiment, and may be modified without departing from the gist of the invention, and the modified ones can be used. For example, the restricting element of the pushing piece 30 and the sliding piece 40 may be a dovetail groove and a projection that engages with the dovetail groove. In this case, the dovetail groove may be provided on the pushing piece 30, and the projection may be provided on the sliding piece 40, or the projection may be provided on the pushing piece 30, and the dovetail groove may be provided on the sliding piece 40. Similarly, as for the restricting element of the sliding piece 40 and the retaining piece 50, a tilted projection may be provided on the sliding piece 40, and a dovetail groove may be provided on the retaining piece 50. The same applies to the restricting element of the pushing piece 30 and the molding member sliding piece 72 and the restricting element of the retaining piece 50 and the molding member sliding piece 72.

In the undercut processing mechanism of the present invention, as for the horizontal grooves 34, the projections 42, the dovetail grooves 46, 78, and 79, and the tilted projections 38, 54, and 58, the cross-sectional shapes of the fitting portions or the engagement portions are not limited to the rectangular shapes shown in the drawings, and may be circular shapes, triangular shapes, or the like. In addition, in the undercut processing mechanism of the present invention, the restricting element of the pushing piece 30, the sliding piece 40, the retaining piece 50, and the molding member sliding piece 72 are not limited to the horizontal grooves 34, the projections 42, the dovetail grooves 46, 78, and 79, and the tilted projections 38, 54, and 58, and, for example, linear guides or the like may be used.

Figure 10A:
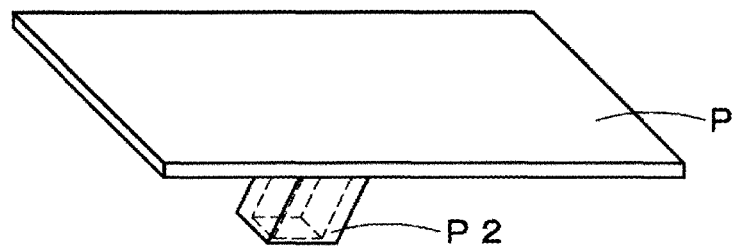
FIGS. 10A, 10B, and 10C show perspective views each showing an example of a molded article that can be formed by the undercut processing mechanism and the molding die assembly of the present invention.
Figure 10B:
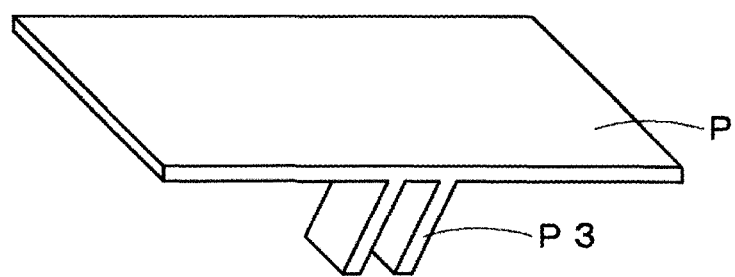
Figure 10C:
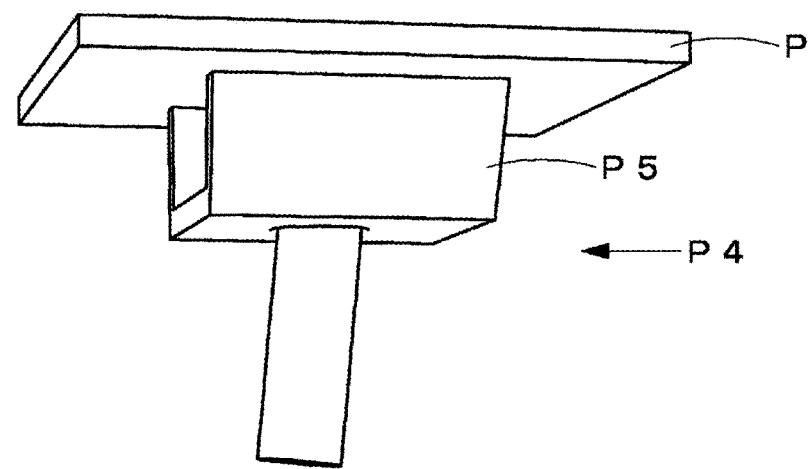

The molded article that can be formed by the molding die assembly of the present invention is not limited to one having a cylindrical boss as an undercut portion. FIG. 10A, FIG. 10B, and FIG. 10C are each a perspective view showing an example of a molded article that can be formed by the undercut processing mechanism and the molding die assembly of the present invention. The molding die assembly and the undercut processing mechanism of the present invention can be suitably used particularly for molding and demolding an undercut portion that has a plurality of projection portions each having a hollow portion or a space portion to be formed by a molding member such as the center pin 70 and aligned in a direction parallel to a surface on which the undercut portion projects in a vertical cross-sectional view. The undercut portion P1 described in the first embodiment, and the undercut portions shown in P2, P3, and P4 shown in FIGS. 10A to 10C provide examples of such undercut portions. The undercut portions of such configurations cannot be demolded by a conventional loose core which moves in a direction orthogonal to the demolding direction of the molded article P.

The molded article that can be formed by the molding die assembly of the present invention is not limited to one having an undercut portion projecting in a direction intersecting the demolding direction of the molded article. The undercut processing mechanism of the present invention can be configured as appropriate such that, for example, in forming a molded article P having an undercut portion P4 including a base (pedestal) portion P5 as shown in FIG. 10C or a molded article (not shown) having an undercut portion P4 composed of only a base portion P5, the sliding piece and/or the molding member sliding piece moves in conjunction with movement of the pushing piece in the demolding direction of the molded article such that the undercut portion is allowed to be demolded.

In the molding die assembly of the present invention, a plurality of undercut processing mechanisms can be provided. That is, with the undercut processing mechanism and the molding die assembly of the present invention, a molded article having undercut portions such as a plurality of cylindrical bosses can be molded and demolded. In addition, in the case where directions in which the respective undercut portions can be demolded are different, the tilt angles of the restricting element of the pushing piece, the sliding piece, the retaining piece, and the molding member sliding piece in each undercut processing mechanism may be set as appropriate such that the corresponding undercut portion is allowed to be demolded.

In the undercut processing mechanism and the molding die assembly of the present invention, the corner and the side edge of each component may be, for example, rounded or chamfered.

The materials of the components used in the undercut processing mechanism and the molding die assembly of the present invention are not limited to specific materials, and the same materials as those of components which are used in known undercut processing mechanisms and molding die assemblies may be used as appropriate. However, the sliding surface of each component is preferably formed from a material having good slidability or a material that has been subjected to favorable surface treatment. Each sliding surface is not limited to a surface brought into surface contact and may be a surface brought into line contact or point contact.

The undercut processing mechanism of the present invention is applicable to a molding die assembly that is opened and closed in the horizontal direction, the vertical direction, or another direction.

The undercut processing mechanism and the molding die assembly of the present invention can be suitably used for a molding die assembly such as a die-casting mold, a press mold (press molding die assembly), etc., in addition to the injection mold (injection molding die assembly).

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCE NUMERALS

1 . . . molding die assembly
10 . . . undercut processing mechanism
20 . . . holder
30 . . . pushing piece
31 . . . upper surface
34 . . . horizontal groove
36 . . . molding surface
38 . . . tilted projection
40 . . . sliding piece
41 . . . upper surface
42 . . . projection
44 . . . molding surface
46 . . . dovetail groove
50 . . . retaining piece
54 . . . first tilted projection
58 . . . second tilted projection
60 . . . sleeve pin
66 . . . distal end surface
70 . . . center pin
72 . . . molding member sliding piece
78 . . . first dovetail groove
79 . . . second dovetail groove
P . . . molded article
P1, P2, P3, P4 . . . undercut portion
P5 . . . base portion

What is claimed is:

1. An undercut processing mechanism that is installed in a molding die assembly configured to form a molded article having an undercut portion so as to allow demolding of the undercut portion, the undercut processing mechanism comprising:
a pushing piece movable in a demolding direction of the molded article;
a support element fixed to the pushing piece or formed so as to be integrated with the pushing piece and capable of supporting the undercut portion during movement of the pushing piece,
wherein the support element is configured to move while being in contact with the undercut portion when the pushing piece moves in the demolding direction of the molded article;
a sliding piece configured to be slidable relative to the pushing piece and to move, in conjunction with movement of the pushing piece, in a direction intersecting the demolding direction of the molded article;
a retaining piece configured to retain the sliding piece such that the sliding piece is slidable,
wherein the mechanism is configured such that when the pushing piece is moved in the demolding direction of the molded article, the sliding piece moves in a direction apart from the undercut portion in conjunction with the pushing piece while the support element supports the undercut portion, so that the undercut portion is allowed to be demolded;
a molding member configured to form a hollow portion or a space portion of the undercut portion such that the molded article having the hollow portion or the space portion in the undercut portion is allowed to be formed; and
a molding member sliding piece fixed to the molding member or formed so as to be integrated with the molding member and configured to be slidable relative to the pushing piece and the retaining piece, and to move such that the molding member is pulled out of the hollow portion or the space portion of the undercut portion when the pushing piece is moved in the demolding direction of the molded article, wherein an upper portion of the pushing piece has a recess that provides a hollow space such that an entire portion of the sliding piece is fitted therein, an inner side of a surface of the recess provides a molding surface to form an outer circumferential surface of the undercut portion, and the sliding piece has a tilted surface opposing the pushing piece, the tilted surface including a molding surface to form an outer circumferential surface of the undercut portion.

2. The undercut processing mechanism as claimed in claim 1, wherein the pushing piece and the sliding piece have molding surfaces for forming the undercut portion.

3. The undercut processing mechanism as claimed in claim 1, wherein the pushing piece and/or the sliding piece is configured to be able to support the molded article when the pushing piece is moved in the demolding direction of the molded article.

4. The undercut processing mechanism as claimed in claim 1, wherein the pushing piece and the retaining piece each include a restricting element for restricting a movement direction of the sliding piece to a direction in which the undercut portion is allowed to be demolded.

5. The undercut processing mechanism as claimed in claim 1, further comprising a holder fixed to the molding die assembly or formed so as to be integrated with the molding die assembly, wherein the holder is configured such that, among components forming the undercut processing mechanism, other components excluding the holder are partially or fully housed in the holder in the time of die clamping.

6. A molding die assembly comprising the undercut processing mechanism as claimed in claim 1.

7. The undercut processing mechanism as claimed in claim 1, wherein the support element includes a molding surface of the undercut portion and supports the undercut portion by the molding surface when the pushing piece moves in the demolding direction of the molded article.

8. The undercut processing mechanism as claimed in claim 1, wherein the sliding piece is slidably engaged with the pushing piece via a projection and a horizontal groove, and the sliding piece is slidably engaged with the retaining piece via a tilted projection and a dovetail groove.

* * * * *